United States Patent Office 3,061,650
Patented Oct. 30, 1962

3,061,650
BISYMMETRICAL PHENOLIC COMPOUNDS
Robert Steckler, Chagrin Falls, Ohio, Jesse Werner, Holliswood, N.Y., and Frederick A. Hessel, Montclair, N.J., assignors to General Aniline & Film Corporation, New York, N.Y., a corporation of Delaware
No Drawing. Filed Sept. 30, 1958, Ser. No. 764,231
6 Claims. (Cl. 260—611)

The present invention relates to a new class of bisymmetrical phenolic compounds which are useful as intermediates in the preparation of a diversified number of new and useful chemical products.

We have discovered that monohydric phenols and polyhydric phenols readily react with polyalkoxy acetals to yield bis-phenols which are useful intermediates in the preparation of new types of chemical compounds and compositions. These bis-phenols are characterized by the following general formula:

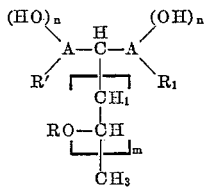

wherein A represents an aryl group, e.g. phenyl, diphenyl, naphthyl or anthracyl, R represents an alkyl radical of 1 to 5 carbon atoms, e.g. methyl, ethyl, propyl, isopropyl, butyl, amyl, etc., $R_1$ represents hydrogen, or an alkyl group of 1 to 18 carbon atoms, e.g. methyl, ethyl, propyl, butyl, amyl hexyl, octyl, nonyl, di-octyl, di-nonyl, decyl, dodecyl, stearyl, etc., halogen, e.g. chlorine or bromine, amino, nitro, nitrile, carbonyl, chloromethyl, etc., $n$ represents 1 to 3 and $m$ represents 2 to 30, $n$ being 1 to 2 when A is either diphenyl or naphthyl and 1 when A is anthracyl.

The nature or character of the substituted or unsubstituted monohydric phenol or polyhydric phenol compound, which is condensed with the polyalkoxy acetal is immaterial so long as it contains at least one and not more than 3 hydroxy groups. The nature or character of substituents other than hydroxy is likewise immaterial, and the aryl nucleus of such monohydric phenol or polyhydric phenol compound may contain one or more substituents such as alkyl of 1 to 18 carbon atoms, halogen, i.e. chlorine or bromine, amino group, amide, carboxyl, chlormethyl, nitro, nitrile, alkylamide, etc., the only absolute prerequisite being that the mono- or polyhydric phenol compound contain a reactive hydrogen atom attached to the aryl nucleus. To illustrate this where A in the foregoing general formula is a phenyl ring derived from phenol:

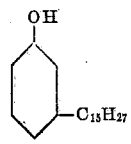

One of the positions 1, 3 or 5 must be hydroxy and the remaining positions, including 2 and 4, may be hydrogen, hydroxy, alkyl, phenyl, alkoxy, amino, halogen, nitro, etc. or any of the other substituents referred to above.

As illustrative of such monohydric and polyhydric phenol compounds, the following may be mentioned: phenol, o-, m-, and p-cresol, chlorophenols, nitrophenols, aminophenols, ethyl phenol, isopropyl phenol, butyl phenol, tertiary butyl phenol, hexyl phenol, octyl phenol, decyl phenol, dodecyl phenol, tridecyl phenol, diisobutyl phenol, nonyl phenol, dinonyl phenol, 3-pentadecyl phenol, stearyl phenol, 2,4- and 3,5-xylenol, cardanol, α- and β-naphthols, 2- and 9-hydroxy anthracene, orcinol, catechol, pyrocatechol, resorcinol, methyl resorcinol, 2-aminoresorcinol, hydroquinone, 2-hydroxy-hydroquinone, pyrogallol, phloroglucinol, methyl phloroglucinol, 4,4'-dihydroxy diphenol, 1,5-dihydroxy naphthalene and the like. It is to be noted that cardanol is a technical grade of anacardol having the formula:

wherein the $C_{15}$ side chain contains two double bonds and is linear.

The polyalkoxy acetals which are condensed with any one of the foregoing monohydric and polyhydric phenol compounds or mixtures thereof are characterized by the following general formula:

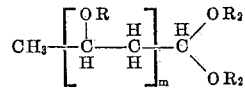

wherein $m$ and R have the same values as above and wherein $R_2$ represents an alkyl group of from 1 to 5 carbon atoms, e.g. methyl, ethyl, propyl, isopropyl, butyl, isobutyl, amyl, etc.

Illustrations of such polyalkoxy acetals, the following may be mentioned:

1,1,3,5-tetramethoxy hexane
    1,1,3,5-tetraethoxy hexane
    1,1-diethoxy-3,5-dimethoxy hexane
    1,1,3,5,7-pentamethoxy octane
    1,1,3,5,7,9-hexmethoxy decane
    1,1,3,5,7,9,11-heptamethoxy dodecane
    1,1,3,5,7,9,11,13-octamethoxy tetradecane
    1,1,3-trimethoxy-5-ethoxy hexane
    1,1-dimethoxy-3,5-ethoxy hexane
    1,1-dimethoxy-3,5,7-ethoxy octane
    Polyalkoxy acetal obtained by condensing 1 mole of methanol with 30 moles of vinyl methyl ether It is to be noted that the higher polyalkoxy acetals may be obtained by employing 1 mole of either ethanol, propanol, butanol, monoethers of glycols, or any aromatic alcohol instead of methanol.

It is to be further noted that a mixture of two or more of the foregoing specific polyalkoxy acetals may be condensed with a mono- or poly-hydric phenol. The ratio of the polyalkoxy acetals constituting the mixture is immaterial, as only 1 molecular equivalent thereof will condense with 2 molecular equivalents of the mono- or polyhydric phenol. The resulting bis-phenol compounds are included with the scope of the appended claims.

The foregoing polyalkoxy acetals and numerous species thereof are prepared in accordance with the methods disclosed in U.S. Patents 2,165,962 and 2,487,525. The methods of their preparation and the various species disclosed therein, which conform to the foregoing general formula, are incorporated herein by reference thereto.

From a visual inspection of the generic formula of the new bis-phenol compounds prepared in accordance with the present invention, it will be noted that the aryl nuclei characterized by A are joined by a carbon atom bearing a polyalkoxy alkane chain as a substituent instead of the conventional alkane chain ranging from 1 to 5 carbon atoms. The presence of the polyalkoxy alkane chain in the bis-phenol compounds of the present invention provides the new and unexpected property of imparting to the bis-phenols greatly improved compatibility with polar type chemicals, increased reactivity with lower aldehydes, flexibility and antistatic properties.

In preparing the new type of bis-phenol compounds of the present invention, 2 moles of a monohydric or polyhydric phenol are condensed with 1 mole of a polyalkoxy acetal under the usual reaction conditions. As catalyst, we found that acids such as sulfuric acid, phosphoric acid, chloracetic acid, dichloracetic acid, trichloracetic acid, trifluoracetic acid, fluoboric acid, hydrochloric acid, alkane sulfonic acids, aryl sulfonic acids, etc., may be employed. The catalyst concentration and temperature of reaction should be such as to eliminate possible side reactions. In other words, there is a relationship between the reactivity of the monohydric or polyhydric phenol and the reaction conditions employed. Very reactive phenols such as phenol, resorcinol, phloroglucinol and the like will react rapidly with the polyalkoxy acetals in the presence of dilute acids and mild temperatures such as 35–50° C. Less reactive phenols such as o-cresol, 2-4 and 3-5-xylenols, 2-anthrol and 1,5-dihydroxy naphthalene and the like are best reacted at or near reflux by employing a strong concentration of an acid such as will not cause sulfonation of the resulting product thereby diminishing the yield. Under such circumstances, instead of the inorganic acids, alkyl or aryl sulfonic acids are preferred. The acids which may be used include among others:

Sulfuric acid
Phosphoric acid
Chloracetic acid
Dichloracetic acid
Trichloracetic acid
Trifluoracetic acid
Fluoboric acid
Hydrochloric acid
Alkane sulfonic acids
Aryl sulfonic acids The following examples, which are merely illustrative, will show the preparation of several types of the new class of bis-phenol compounds. All parts given are by weight.

*Example I*

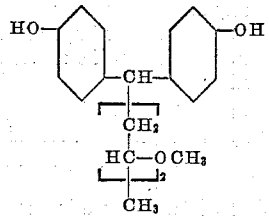

To a three-necked flask equipped with a stirrer, thermometer and reflux condenser there were added 424 parts of commercial grade concentrated sulfuric acid (95–98%) and 424 parts of glacial acetic acid with cooling to maintain the temperature at 50° C. To this is then added 188 parts of phenol dissolved in 10% by weight of water. After the latter mixture had been stirred for a period of a few minutes, there was then added 206 parts of 1,1,3,5-tetramethoxy hexane dropwise over a 25 minute period while maintaining the temperature between 55–60° C. The reaction contents were stirred for an additional 50 minutes and then allowed to stand overnight.

The reaction mixture was dissolved in 5% aqueous caustic to give a clear amber solution. On addition of carbon dioxide gas the bis-phenol compound precipitated and was separated by filtration. Washing with water followed by air drying yields a soft resinous compound that is insoluble in benzene, but soluble in acetone and methyl ethyl ketone. A molecular weight determination was made in the conventional manner and the following results obtained: Calculated, 330. Found, 337. It is to be noted that the solubility of the resinous material in dilute caustic and insolubility in sodium carbonate definitely establishes that the phenolic hydroxyl in the bis-phenol compound is still intact. It is also of interest to note that the polymethoxy acetal is soluble in benzene while the reaction product is insoluble.

*Example II*

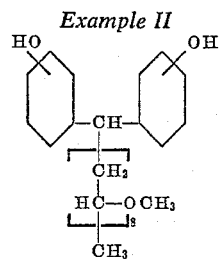

Example I was repeated with the exception that the 1,1,3,5-tetramethoxy hexane was replaced by an equivalent amount of a polymethoxy acetal obtained by condensing 10 moles of vinyl methyl ether with 1 mole of methanol (technical grade of PMAC–10). The final product was precipitated by the bubbling of carbon dioxide gas and separated by filtration. Washing with water followed by air drying yielded a similar soft resin which is insoluble in benzene but soluble in acetone and methyl ethyl ketone. The material is soluble in dilute caustic but insoluble in sodium carbonate thus indicating that the phenolic hydroxyl groups did not partake in the reaction. The molecular weight of the product is as follows: Calculated, 678. Found, 685.

*Example III*

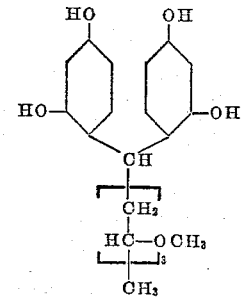

To a three-necked flask equipped with stirrer, thermometer and reflux condenser there were added 53 parts of sulfuric acid of 40% concentration and 12 parts of resorcinol. To this mixture there were then added 30 parts of 1,1,3,5,7-pentamethoxy octane dropwise over a 25–30 minute period while maintaining agitation and a temperature between 34–50° C. The reaction mixture was stirred for an additional 30 minutes and then allowed to stand overnight. The final reaction product is soluble in water and in 10% aqueous caustic. The addition of carbon dioxide gas or ammonium carbonate precipitates a pink resinous material from the caustic solution, which is soluble in acetone. The molecular weight of the acetone soluble product is as follows: Calculated, 420. Found, 415.

In connection with the foregoing example, it is to be noted that if a substituted phenol, other than hydroxyl, is used, the sulfuric acid concentration that is optimum is about 72.5%. On the other hand, if a polyhydric phenol is employed, the sulfuric concentration that is optimum for best results is about 40%.

*Example IV*

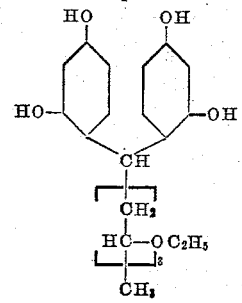

Example III was repeated with the exception that 30 parts of 1,1,3,5,7-pentamethoxy octane were replaced by 15 parts of 1,1,3,5,7-pentaethoxy octane. On standing overnight, a very light amber resinous material separates. After decanting the supernatent liquid the resin layer was dissolved in 10% caustic and precipitated with carbon dioxide gas. On washing with water and air drying a friable bis-phenolic compound was obtained. A molecular weight determination was made and the following results obtained: Calculated, 462. Found, 466.

*Example V*

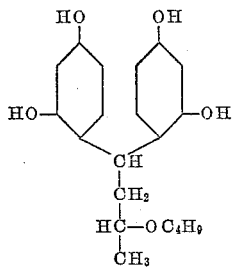

To a three-necked flask equipped with a stirrer and thermometer there were added 53 parts of sulfuric acid of 40% concentration and 12 parts of resorcinol. The stirring was continued and then added dropwise were 15 parts of 1,1,3-tributoxy butane over a period of 25–30 minutes while maintaining the temperature between 35–40° C. It was noted that the reaction was mildly exothermic. On standing overnight an amber resin separated which was derived by dissolving it in 10% aqueous caustic and reprecipitated with carbon dioxide ags. The final resinous material is insoluble in water but soluble in acetone. The molecular weight of the acetone soluble product was determined and the following results obtained: Calculated, 346. Found, 353.

*Example VI*

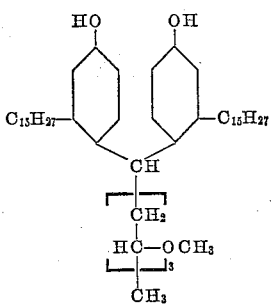

To a three-necked flask equipped with stirrer and thermometer there was added 53 parts of sulfuric acid of 72.5% concentration and 12 parts of cashew nut shell liquid (cardanol, a technical grade of anacardol) and the mixture heated to 60° C. Thereafter, the heat source was removed and 15 parts of 1,1,3,5,7-pentamethoxy octane were added dropwise during a 20–25 minute period while maintaining the stirring. The viscosity increased during the reaction. The reaction mixture was brought down to room temperature and all unreacted starting material extracted with benzene. The remaining product was purified by dissolving it in 10% aqueous caustic followed by reprecipitation with ammonium carbonate. The molecular weight of the purified product is as follows: Calculated, 800. Found, 804.

*Example VII*

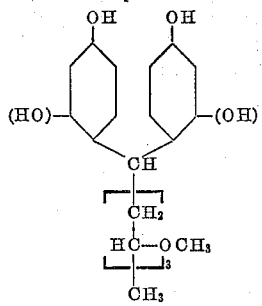

In a three-necked flask equipped with stirrer and thermometer there were added 53 parts of sulfuric acid of 40% concentration, 7 parts of resorcinol and 5 parts of phenol and the mixture heated to 40° C. at which temperature there was added dropwise with stirring during a 25 minute period 15 parts of 1,1,3,5,7-pentamethoxy octane. The stirring was continued for an additional 30 minutes and the reaction mixture allowed to stand overnight, then neutralized with 10% aqueous caustic which resulted in a clear, stable solution. Addition of carbon dioxide gas gave a precipitate. On separation, washing with water and drying, a very slightly tacky friable bisphenol compound was obtained. Due to the blend of phenol and resorcinol, the end product is mainly a mixed phenol-resorcinol bis-phenol, also containing some diphenol and di-resorcinol bis-phenols.

It should be noted in regard to this example that reacting either phenol or resorcinol alone with the polyalkoxy acetal in the sulfuric acid does not give rise to the reaction product obtained when both phenol and resorcinol or mixtures thereof are present together with the polyalkoxy acetal.

*Example VIII*

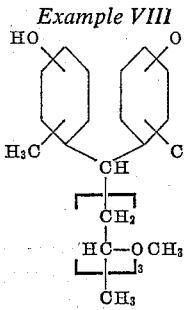

To a three-necked flask equipped with stirrer and thermometer there were added 12 parts of refined cresol consisting of 15.5% phenol, 13.0% o-cresol, 41.6% m-cresol, 23.4% p-cresol, 6.5% low boiling xylenols, 39 parts of benzene sulfonic acid and 14 parts of water. Then at room temperature with stirring there was added dropwise during a period of 20–25 minutes 15 parts of 1,1,3,5,7-pentamethoxy octane. A slight exothermic reaction occurs but the solution is cloudy in aqueous caustic and no precipitate is observed after the addition of carbon dioxide gas. The reaction mixture was then heated to 75° C. in 15 minutes then to 90° C. in 15 minutes, then allowed to cool to room temperature. A sample dissolved in 10% sodium hydroxide gave a clear solution from which a resin precipitated on the addition of either carbon dioxide gas or ammonium carbonate. A molecular weight determination was made and the following results obtained: Calculated, 630. Found, 622.

*Example IX*

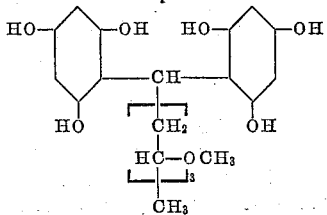

To a three-necked flask equipped with stirrer, thermometer and heat source there were charged at 44° C., 24 parts of phloroglucinol, 42.4 parts of sulfuric acid of 95–98% concentration and 63.6 parts of water. While the phloroglucinol is not completely soluble in the mixture nevertheless it is suspended in solution. To the reaction mixture is added slowly dropwise during 20 minutes 30 parts of 1,1,3,5,7-pentamethoxy octane while maintaining the temperature at 40° C. Shortly thereafter a very stiff resin is formed. After standing overnight the resin is soluble in 20% aqueous sodium hydroxide and was precipitated with carbon dioxide gas. A molecular weight determination was made and the following results obtained: Calculated, 452. Found, 460.

*Example X*

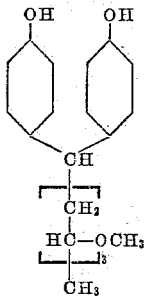

In a three-necked flask equipped with stirrer, thermometer and reflux condenser there were added while maintaining a temperature of 55–60° C. 106 parts of glacial acetic acid, 106 parts of sulfuric acid of 95–98% concentration, 54 parts of a mixture consisting of 90% phenol and 10% of water. To this mixture while maintaining the temperature at 55–60° C. there was added dropwise with continuous stirring during a period of 20 minutes 120 parts of 1,1,3,5,7-pentamethoxy octane. Shortly thereafter the bis-phenol compound separated and was allowed to stand overnight. The resulting bisphenol compound was dissolved in 10% aqueous sodium hydroxide from which it was precipitated by the addition of carbon dioxide gas. A molecular weight determination showed the following results: Calculated, 388. Found, 395.

Each and every one of the bis-phenol compounds prepared in accordance with the foregoing examples and characterized by the above general formula provides a new and useful intermediate in the preparation of various compounds and compositions having commercial utility. For example they may be condensed with formaldehyde to form phenolic type resins which may be further modified by coreaction with incorporation of various phenols, urea or melamine during the reaction step. By such condensation and by proper choice of coreactants, a wide range of properties can be obtained. The bis-phenols by themselves as well as in admixture with other currently available di- or polyhydric phenols can be reacted with phosgene, or diesters of carbonic acid, or with chloro alkyl carbonates, to form polycarbonates having a wide range of new and useful properties.

The bis-phenol compounds may be reacted with alkylene oxides or alkylene carbonates to yield bis- or polyhydroxyalkyl ethers. The length of the ether chain will be dependent upon the number of moles of either alkylene oxide or alkylene carbonate employed. This may range from 1 to 20 moles of alkylene oxide or alkylene carbonate per hydroxyl group in the bis-phenol compound. These hydroxyalkyl ethers can be further reacted with isocyanates to form novel and useful polyurethanes. They may be further reacted with mono- and/or poly-functional acids, i.e. saturated or unsaturated, to yield a new and interesting class of polyesters and alkyds.

The polyhydroxy alkyl ethers, especially those containing more than 3 moles of alkylene oxide, show definite emulsifying and detergent properties. The polyhydroxy alkyl derivatives may also be sulfated or sulfonated to yield new compounds, useful as detergents or synthetic tanning agents. The bis-phenol compounds are readily reactive with epichlorhydrin in the usual manner to yield epoxy resins having definitely a new range of physical characteristics.

In order to illustrate the manner in which the new bisphenol compounds of the present invention may be utilized as intermediates in the preparation of new and useful commercial products, the following examples are given.

*Example XI*

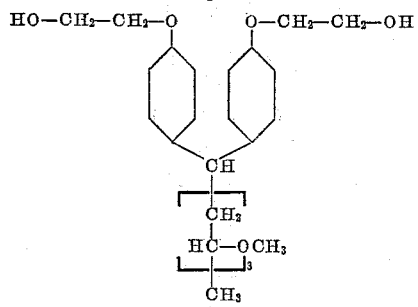

An intimate mixture was prepared consisting of 40 parts of the bis-phenol compound of Example X, 40 parts of ethylene carbonate and 1.6 parts of potassium carbonate. The mixture was then heated at 120° C. for 17 hours. At the start of the reaction, evolution of carbon dioxide caused foaming which slowly abated as reaction went to completion. The cooled reaction mass was then thoroughly washed with water in a Waring Blendor and then dried. The resulting resin is hard, brittle and non-caking at room temperature. It is still soluble in acetone and methyl ethyl ketone but insoluble in aqueous caustic. This clearly demonstrates that the phenolic hydroxyls of the bis-phenol compound have reacted. A molecular weight determination showed the following results: Calculated, 476. Found, 485.

It was observed that if the above reaction is repeated by heating the bis-phenol compound of Example X with or without potassium carbonate and without ethylene carbonate, the reaction product is still soluble in aqueous caustic and precipitates when carbon dioxide gas is added. This establishes that there are no changes which may be attributable to the influence of the heating cycle.

*Example XII*

To 100 parts of the bis-phenol compound of Example X and 1 part of potassium hydroxide, ethylene oxide was bubbled through at 160° C. until a weight increase of 18–20 parts is obtained. This takes about 4 hours. The final product contained approximately 1.05 moles of ethylene oxide per each phenolic hydroxyl group. Instead of utilizing ethylene oxide, propylene oxide may also be employed but in such case the condensation reaction should be carried out at super-atmospheric pressures in order to obtain a product containing more than 1 mole of propylene oxide per each phenolic hydroxyl. If only 1 mole of propylene oxide is desired then the propylene carbonate may be used in lieu of the ethylene carbonate as in Example XI.

*Example XIII*

In a three-necked flask equipped with stirrer, thermometer and a (Dean-Stark) water separator there were added 294 parts of maleic anhydride, 260 parts of dipropylene glycol, 504 parts of the bishydroxyethyl ether-bis-phenol compound of Example XI. The mixture was heated to 175° C. over a period of 25 minutes and then held at this temperature for one hour to complete the esterification, the water formed in the reaction being removed by distillation. The acid number of the polyester product is 48. It is a viscous semi-solid resin which can be cured with styrene, a mixture of styrene and diallyl phthalate or styrene and vinyl pyrrolidone with the usual organic peroxide catalyst in the conventional manner.

Example XIV

To a three-necked flask equipped with thermometer, stirrer and water separator as in Example XIII there were added 12 parts of dehydrated castor oil fatty acids, 11 parts of bishydroxy ethyl ether-bis-phenol compound of Example XI, 4.4 parts of pentaerythritol and 8.4 parts of phthalic anhydride. The mixture was heated to 180° C. over a 30 minute period and then held at the same temperature for 2 hours while adding small amounts of xylene to azeotrope off water. Thereafter sufficient xylene was added to the reaction mixture to give 50% solids. The resulting alkyd resin solution has an acid number of 15, and a Gardner-Holdt viscosity of U.

Example XV

To a three-necked flask equipped with stirrer, thermometer and reflux condenser there were charged 100 parts of the bisphenol compound of Example X and 235 parts of epichlorohydrin. The mixture was heated with stirring to 75° C. and 140 parts of 50% aqueous caustic soda added over a 1 hour period, while maintaining the temperature at 75–80° C. During the final reaction the product is in the form of a slurry to which methyl ethyl ketone and water was added. On standing overnight the reaction mixture separates into two layers. The methyl ethyl ketone layer containing the reaction product is separated, dried with anhydrous sodium sulfate, filtered, and the methyl ethyl ketone solvent evaporated to yield a viscous liquid epoxy resin which remains thermoplastic at 150° C. The liquid epoxy resins cure rapidly with polyamines such as triethylenetetramine to form a hard, clear, light amber resin. It is excellent for castings, adhesives, potting compounds, laminates, etc.

Example XVI

To a three-necked flask equipped with stirrer, thermometer and reflux condenser there were charged 300 parts of the bisphenol compound of Example X and 235 parts of epichlorohydrin. The mixture was heated to 75° C. and 150 parts of 50% aqueous caustic soda added over a period of 75 minutes while maintaining the temperature between 75–80° C. The mixture was stirred for an additional 45 minutes after which it became quite stiff. Then there was added 200 parts of methyl ethyl ketone. After standing at room temperature for a short while, the reaction mixture separated into two layers. The ketone layer was separated, dried with anhydrous sodium sulfate, filtered, and the methyl ethyl ketone removed by evaporation to obtain the resinous product. It was a hard, brittle, light amber epoxy resin which is thermoplastic but cures with the usual organic amines or dibasic acids or urea, melamine, or phenolic resins. It may be applied as a basis in coating compositions and with alkyl resins.

Inasmuch as the epoxy resins prepared in accordance with Examples XV and XVI are capable of being cross-linked, this is clearly indicative that the starting material of Example X is indeed a bisphenol compound. If the phenolic hydroxyls had reacted during condensation with the polymethoxy acetal or if there were not at least two phenolic hydroxyls to react with the epichlorohydrin then the resulting compounds of Examples XV and XVI would not have given cross-linked resins that are actually obtained.

Example XVII

The bisphenols compounds of the present invention either alone or with additional phenol, urea or with melamine or mixtures thereof are readily reacted with formaldehde to give a series of resins which among their interesting properties display permanent antistatic action. This property is especially useful in textile applications, rugs, plastics, etc. From our laboratory work and studies in connection with the present invention, we believe that this unusual property is attributable to the presence of the polyalkoxy alkane chain in the bisphenol molecule. Since the latter chain is an integral part of the resin, its antistatic action is considered permanent. A typical preparation of this type resin is as follows:

To a three-necked flask equipped with thermometer, stirrer and reflux condenser there were added 15 parts of the bisphenol compound of Example X, 60 parts of urea, 225 parts of Methyl Formcel (a mixture of hemiacetals of monomeric and polymeric formaldehyde and methanol), whose composition is as follows:

40% by weight of formaldehyde
53% by weight methanol
7% by weight water and 20 parts of formic acid as a catalyst. The mixture was heated to reflux and held 3 hours, the temperature during reflux being about 80° C. Samples of the liquid reaction mixture taken at frequent intervals are cloudy at first but clear up later and become tack-free and hard after evaporation of the solvents. The final cure time at 150° C. is gelled in 20 seconds, cured in 30 seconds.

Tests have shown that films cast from this resin have excellent antistatic properties and will not retain electrostatic charges. Instead of urea, melamine, dicyandiamide and other nitrogen compounds may be employed to give resins with the same excellent antistatic properties.

Example XVIII

Example XVII was repeated as follows:

To a three-necked flask equipped with thermometer, stirrer and reflux condenser there were added 20 parts of the bisphenol compound of Example V, 30 parts of urea, 175 parts of Methyl Formcel and 15 parts of formic acid as a catalyst. The mixture was heated to reflux for one hour. The reaction mixture was worked up as described in Example XVII, and the resin isolated in the same manner. Films cure rapidly and show excellent antistatic properties.

Example XIX

By reacting 1 mole of the bisphenol compound of Example X with 30 moles of ethylene carbonate, a high molecular weight water soluble viscous liquid is formed. This viscous liquid has potential application as a surface active ingredient; as a coating or foam, by reaction with isocyanates; as a modifier for polyurethanes; and as a plasticizer for various types of synthetic resins.

In preparing such high molecular weight water soluble viscous liquid, a mixture consisting of 132 parts of ethylene carbonate, 25 parts of the bisphenol compound of Example X and 2 parts of potassium carbonate were heated to 160° C. and held for 16 hours. During the reaction approximately 70 parts of carbon dioxide by weight were lost. The resulting oily product forms clear solutions with water in all proportions; such solutions when shaken or rapidly stirred, readily develop foams. Unstable emulsions are formed when linseed oil is added to a solution of the product and shaken. Aqueous solutions of the resulting product wet both steel and glass exceptionally well.

Example XX 20 parts of the bishydroxy ethyl ether-bisphenol compound of Example XI was dissolved in 30 parts of methyl ethyl ketone and mixed intimately with 6 parts of tolylene diisocyanate. To this solution there was then added 0.1 part of dimethyl ethanolamine. Films of the resulting solution were cast on glass and steel. After 1 hour at room temperature an exceptionally tough abrasion resistant and adherent film was obtained. The solution from which these films were cast gelled in less than 1 hour.

A similar film was prepared by using only 3 parts of tolylene diisocyanate per 20 parts of compound of Example XI and air dried for 1 hour. The films obtained had a very good adhesion resistance, adhesion and toughness although not quite equal to the film prepared with 6 parts of tolylene diisocyanate.

*Example XXI*

252 parts of the bisphenol compound of Example X were dissolved in 252 parts of acetone. To this solution 54 parts of ethyl chloroformate were added together with a solution consisting of 20 parts of caustic soda and 20 parts of water and 100 parts of methanol. The addition was made slowely while keeping the temperature at 30–35° C. After 3 hours of standing at the same temperature, the precipitated sodium chloride was removed by filtration and the solution heated gradually up to 170° C. to remove water, acetone and any unreacted ethyl chloroformate, and further polymerize the carbethoxylate to the polymeric polycarbonate by splitting off ethanol. The resulting resin is dark amber in color and brittle at room temperature, M.P. 80–100° C. The resin is insoluble in dilute caustic, but soluble in polar solvents.

*Example XXII*

A China-wood oil-phenolic resin varnish was prepared as follows:

200 grams para-phenyl phenol-formaldehyde resin, softening point 195–225° F., specific gravity—1.21 (such as Bakelite Company's BR254), and 200 grams of China-wood oil were heated to 450° F. in 32 minutes in a beaker on a hot plate, and held 30 minutes at 450° F. The resulting varnish was reduced to 50% non-volatiles by the addition of 400 grams of xylol. The final solution has the following characteristics:

Viscosity, Gardner-Holdt _____ E–F
Weight per gallon _____lbs__ 8.0

To 100 grams of the above varnish solution were added 0.18 gram of 6% cobalt naphthenate drier solution and 0.22 gram of 24% lead naphthenate drier solution. The solution was split into 4 equal parts of approximately 25 grams, each in a 100 cc. glass bottle. One bottle was retained as a standard. To the other bottles, we added ½% of the bisphenol of Example I, Example III, or Example VIII, respectively, and the stoppered flasks were kept at room temperature. After one week, the standard had skinned over very heavily and was practically gelled. The other 3 solutions which had been stabilized by our bisphenol materials were still unchanged after more than 2 weeks.

*Example XXIII*

100 parts of a low molecular polyvinyl chloride resin of the lacquer type, molecular weight 20,000 to 50,000, were dissolved in 400 parts of methyl ethyl ketone and added 3 parts of butyl epoxy stearate, and 2 parts of dibutyl tin dilaurate. To 50 gram portions of the above solutions, we added our bisphenols of Examples I, III and VII respectively. Films were cast on glass from the resin solution containing none of our bisphenols as well as the 3 bisphenol modified solutions. After air drying, these films were heated in an oven at 370° F. Periodic examination showed that the standard film which did not contain any of our bisphenols darkened rapidly, whereas our bisphenol modified films showed greatly improved heat stability and resistance to darkening or embrittlement.

We claim:

1. A bisphenol compound having the following general formula:

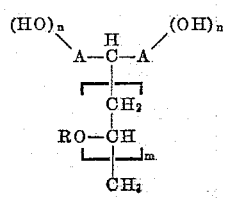

wherein A represents an aryl group selected from the class consisting of phenyl, diphenyl, naphthyl and anthracyl, R represents an alkyl radical of 1 to 5 carbon atoms, m represents a positive integer of from 2 to 30 and n represents a positive integer of from 1 to 3, n being 1 to 2 when A is selected from the class consisting of diphenyl and naphthyl and 1 only when A is anthracyl.

2. A bisphenolic compound having the following formula:

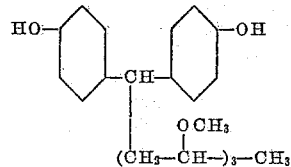

3. A bisphenolic compound having the following formula:

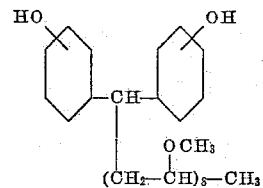

4. A bisphenolic compound having the following formula:

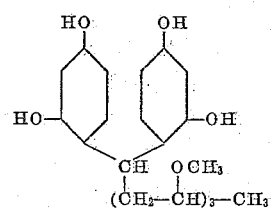

5. A bisphenolic compound having the following formula:

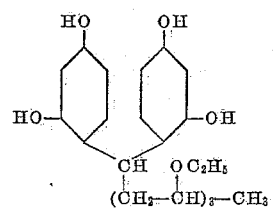

6. A bisphenolic compound having the following formula:

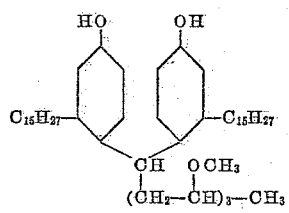

No references cited.